United States Patent [19]
Jennings et al.

[11] Patent Number: 5,119,455
[45] Date of Patent: Jun. 2, 1992

[54] FIBER OPTIC WALL PLATE CONNECTOR SYSTEM

[75] Inventors: Kurt L. Jennings, Niles; Dominic A. Messuri, Canfield; Kenneth P. Cope, Warren, all of Ohio

[73] Assignee: General Motors Corporation, Detroit, Mich.

[21] Appl. No.: 611,257

[22] Filed: Nov. 9, 1990

[51] Int. Cl.⁵ .............................................. G02B 6/38
[52] U.S. Cl. ...................................... 385/81; 385/59; 385/62; 385/69; 385/71; 385/72; 385/84; 385/138; 385/139
[58] Field of Search ............... 350/96.20, 96.21, 96.22, 350/96.23; 385/62, 69, 81, 86, 138, 139, 59, 60, 71, 84, 72

[56] References Cited

U.S. PATENT DOCUMENTS

| | | | |
|---|---|---|---|
| 4,533,209 | 8/1985 | Segerson et al. | 350/96.20 |
| 4,798,440 | 1/1989 | Hoffer et al. | 350/96.20 |
| 4,812,006 | 3/1989 | Osborn et al. | 350/96.21 |
| 4,838,641 | 6/1989 | Morimoto et al. | 350/96.21 |
| 4,872,736 | 10/1989 | Myers et al. | 350/96.20 |
| 4,887,883 | 12/1989 | Darbut et al. | 350/96.21 |
| 4,898,446 | 2/1990 | Hinckley | 350/96.20 |
| 4,960,317 | 10/1990 | Briggs et al. | 350/96.21 |
| 4,969,924 | 11/1990 | Suverison et al. | 350/96.20 |
| 4,979,792 | 12/1990 | Weber et al. | 350/96.20 |
| 4,993,803 | 2/1991 | Suverison et al. | 350/96.20 |
| 5,016,968 | 5/1991 | Hammond et al. | 350/96.20 |

Primary Examiner—Brian Healy
Attorney, Agent, or Firm—Francis J. Fodale

[57] ABSTRACT

A connector system for operatively connecting the ends of two fiber optic cables together. A wall-mountable plate includes an elongated receptacle containing spaced through bores. The bores have opposed frusto-conical entry sections which are joined by a cylindrical central section. A terminal connector is mounted on the end of each cable and has spaced frusto-conical projections which end in cylindrical nose portions containing the ends of the fibers. The terminal connector projections are insertable through opposite ends of the bore into abutment of the nose portions at an interface location along a central portion of the bore. Lock tabs and shoulders on the receptacle and on one of the terminal connectors latch the connector within the bore, with the terminal being held without bias and against reverse movement out of that end of the bore. A collar is slidably mounted on the other terminal connector, with a spring captured between the connector and the collar for biasing them apart. Lock tabs and shoulders on the receptacle and on the collar latch the collar to the receptacle such that the spring biases the connector terminal projection nose portions into engagement. Each of the projection nose portions is configured to mate with the bore central portion, with the combined length of the nose portions being sufficiently greater than the length of the bore central portion to assure mutual abutment of the terminal ends by the spring.

17 Claims, 3 Drawing Sheets

FIBER OPTIC WALL PLATE CONNECTOR SYSTEM

BACKGROUND OF THE INVENTION

This invention relates generally to fiber optic connectors and, more particularly, to a wall-mountable plate incorporating an in-line connector for two fiber optic cables.

There are many instances in the field of fiber optic data transmission, such as in computer LANs (Local Area Networks), which require the in-line connection of two fiber optic cables. This in-line connection can be made via an unmounted connector or through a building wall. The latter requires the provision of a wall-mountable plate mounting the in-line connector.

In some termination systems, both cables are fitted with identical male terminal connectors each having a fiber-carrying ferrule that carries an enlarged collar. Another collar is slidable on the ferrule and a compression spring is entrapped between the collars.

These male connectors are inserted into a double-ended female connector receptacle having a central bore for aligning the optical fibers carried by the male connectors. The slidable collars are latched to the female connector housing so that the springs bias the ferrule ends together to abut the ends of the optical fibers. An arrangement of this type is shown in U.S. Pat. No. 4,898,446 to Hinckley.

This type of terminal structure includes a ferrule, a spring and the collars which are collectively applied to the end of a fiber optic cable together when terminating the cable. Because of their integrated design, these parts are usually scrapped when determination of that cable is required. The increasing use of fiber optics in LANs has accelerated the need to reduce the cost of fiber optic data transmission systems and their component parts. It is therefore desirable to reduce the cost of fiber optic connector systems described above by simplifying their design and the number of parts required.

SUMMARY OF THE INVENTION

It is therefore an object of this invention to provide a low cost fiber optic connector system in which two cables are connected in-line through a wall through a wall-mounted connector.

It is a further object of this invention to provide such a connector system in which the connection of the two cables requires only one spring.

In its one aspect, this invention features a connector system for operatively connecting the ends of two fiber optic cables together, wherein each cable includes at least one optical fiber. This connector system comprises an elongated receptacle containing a through bore and a terminal connector mounted on the end of each cable and containing the end of the fiber at the terminal end thereof. The terminal connectors are insertable through opposite ends of the bore into abutment of the terminal ends at an interface location along a central portion of the bore. First latch means are provided on the receptacle and on a first one of the terminal connectors and are cooperable upon insertion of the connector into the bore through one end thereof for latching the first connector within the bore with the end of its fiber located along said central portion, with the terminal being held without bias and against reverse movement out of that end of the bore. A collar is slidably mounted on a second of the terminal connectors, with a spring captured between the second connector and the collar for biasing them apart. Second cooperable latch means are provided on the receptacle and on the collar for latching the collar to the receptacle upon insertion of the second connector into the bore through the other end into a position such that the spring means biases the second connector terminal end into engagement with the first connector terminal end along the central portion of the bore.

In another aspect, this invention features a wall-mountable plate mounting the receptacle with its portions of the connecting means arranged for connecting the first terminal connector exteriorly of a wall and the second terminal connector interiorly of a wall.

In a further aspect, this invention features each of the connector terminal ends having a nose portion which contains its fiber end and is configured to mate with the bore central portion, with the combined length of the nose portions being sufficiently greater than the length of the bore central portion to assure mutual abutment of the terminal ends by the spring means.

A better understanding of this invention may be obtained by reference to the following detailed description of a preferred embodiment illustrated in the attached drawings, in which:

DETAILED DESCRIPTION OF A PREFERRED EMBODIMENT OF THE INVENTION

Figure 1:
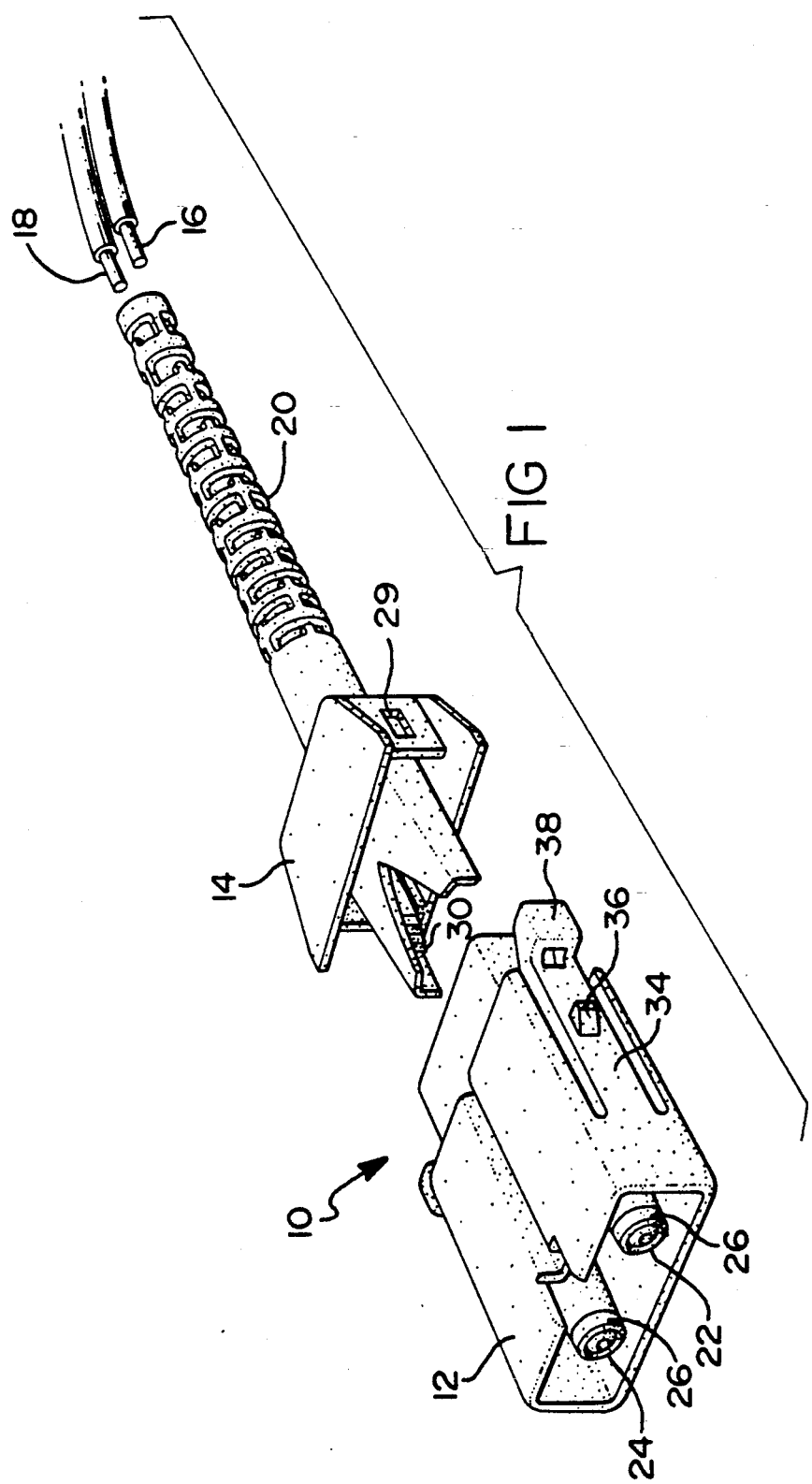
FIG. 1 is an exploded perspective view of a fiber optic cable terminal connector which forms a part of the connector system of this invention.

Referring now to FIG. 1, a terminal connector 10 comprises two interfitting bodies 12 and 14 for terminating a fiber optic cable having a pair of jacketed plastic optical fibers 16 and 18. Bodies 12 and 14 are preferably made of a polyester copolymer, such as Hytrel ®. The fibers 16 and 18 are inserted through a cable guard 20, through body 14 and through guide channels and out of the ends of terminal projections 22, 24 of body 12. Projections 22, 24 are slightly frusto-conical and each taper to a cylindrical nose portion 26.

Body 14 is then inserted into body 12 and is retained by lock tabs 28 (see FIG. 4) on body 12 which engage lock slots 29 on body 14. Upon insertion, gripper teeth 30 on body 14 engage the jacketing of fibers 16 and 18 and trap the fibers against mating walls 32 (see FIG. 4) interiorly of body 12.

The ends of fibers are then snipped off a predetermined distance beyond exit apertures in the noses 26 of projections 22 and 24 and are given a flat smooth finish by a hot plate melting process.

Body 12 includes integral cantilevered side spring arms 34 mounting ramped lock tabs 36 and manual operating tabs 38. These are utilized for assembly, as later described.

Figure 2:
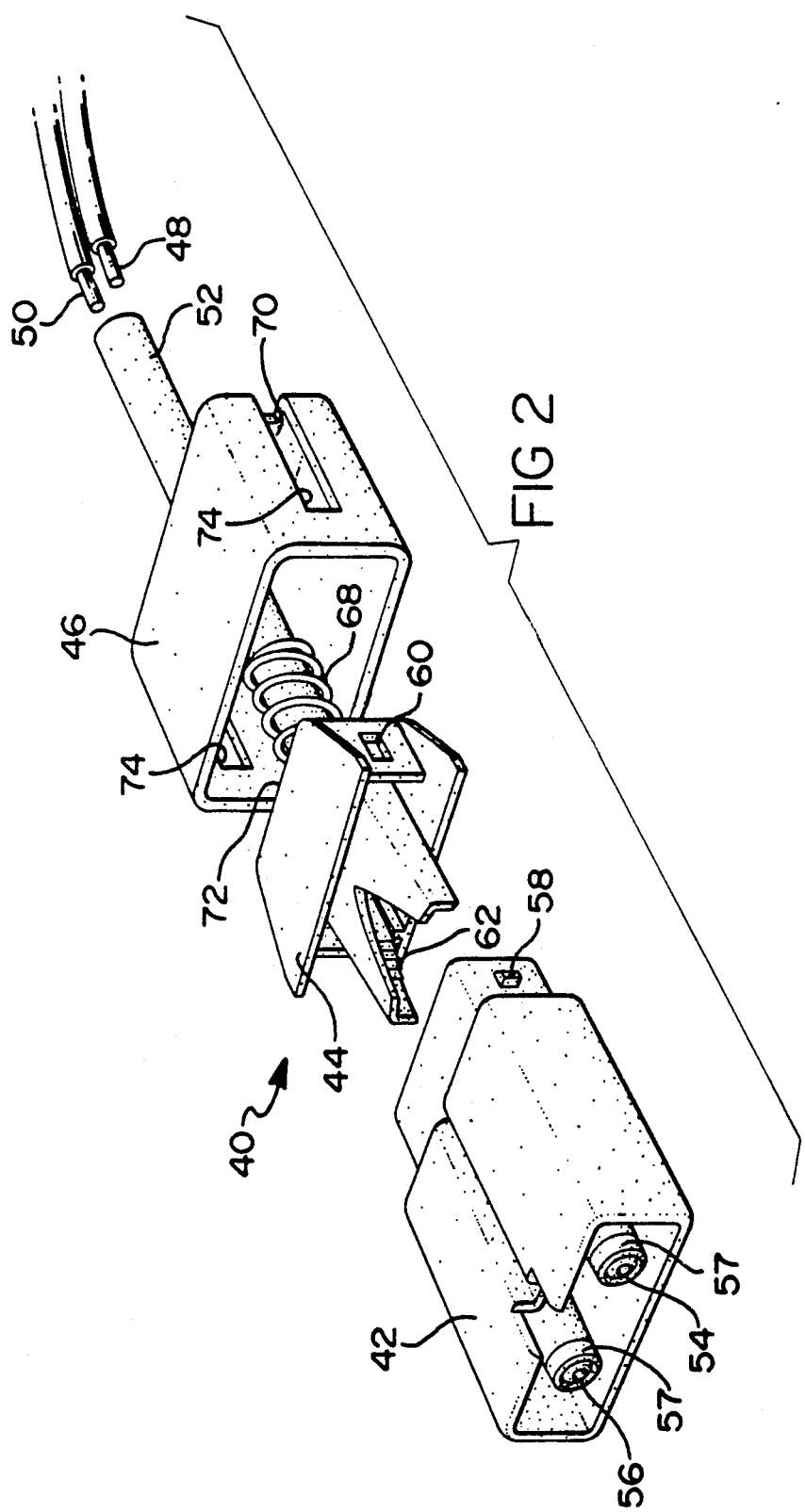
FIG. 2 is an exploded perspective view of another fiber optic cable terminal connector which forms a part of the connector system of this invention.

Referring now to FIG. 2, another terminal connector 40 comprises two interfitting bodies 42 and 44 and a cover member 46 for terminating a fiber optic cable having a pair of jacketed plastic optical fibers 48 and 50. Bodies 42, 44 and 46 are also preferably made of a polyester copolymer, such as Hytrel ®. The fibers 48 and 50 are inserted through a cable guard 52, through body 44 and through guide channels and out of the ends of terminal projections 54 and 56 of body 42. Projections 54 and 56 are slightly frusto conical and each taper to cylindrical nose portions 57.

Body 44 is then inserted into body 42 and is retained by lock tabs 58 on body 42 which engage lock slots 60 on body 44. Upon insertion, gripper teeth 62 on body 44 engage the jacketing of fibers 48 and 50 and trap the fibers against mating walls 63 (see FIG. 4) interiorly of body 42.

The ends of fibers are then snipped off a predetermined distance beyond exit apertures in the nose portions 57 of projections 64 and 66 and are given a flat smooth finish by a hot plate melting process.

Cover member 46 is a generally rectangular receptacle that contains an aperture (not shown) in rear wall 70, enabling cover member 46 to slide on cable guard 52. A compression spring 68 surrounds cable guard 52 and is trapped between the rear wall 70 of cover member 46 and the rear wall 72 of body 44. Cover member has two locking slots 72 formed in its sides.

Figures 3, 4:
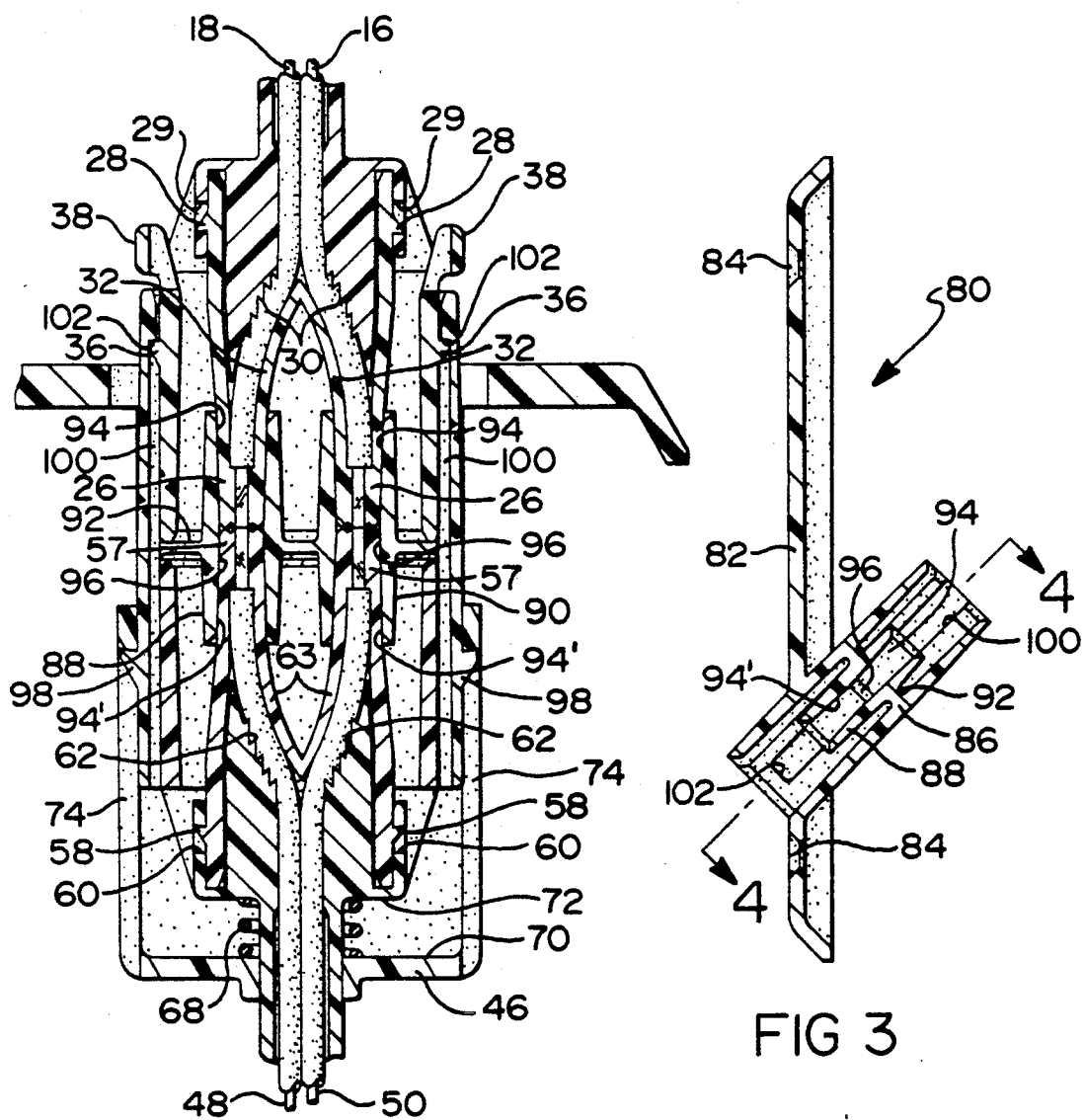
FIG. 3 is a vertical sectional view of a wall-mountable connector for connecting the terminal connectors of FIGS. 1 and 2 and completing the connector system of this invention.
FIG. 4 is a longitudinal sectional view of the connector system of this invention, showing both terminal connectors connected to the wall-mountable connector.

Referring now to FIG. 3, a wall-mountable connector 80 comprises a mounting plate 82, having mounting holes 84, and a female connector housing 86 for interconnecting terminal connectors 10 and 40. Housing 86 includes a pair of identical spaced receptacles 88, 90 that are interconnected and supported within housing 86 by support webs 92.

Receptacles 88, 90 have central bores which comprise converging frusto-conical entry portions 94, 94' joined by a cylindrical central portion 96. The frustoconical entry portions 94, 94' are profiled to mate with projections 22, 24 and 54, 56. The length of the cylindrical center sections must be less than the combined lengths of the terminal nose portions 26 and 57. Thus, nose portions 26 and 57 need not be the same length, but must combine to exceed the length of the receptacle bore central cylindrical sections.

Assembly of components 10, 40 and 80 will now be described with particular reference to FIG. 4. The sides of the interior ends of receptacles 88, 90 mount ramped lock tangs 98. The inner sides of housing 86 contains longitudinal grooves 100 that end in lock shoulders 102. The order of connection of terminal connectors 14, 40 to connector 80 is unimportant. For the sake of illustration, connector 40 will be connected first.

Cover member 46 is grasped and connector 40 is oriented to align projection noses 57 with bore entry portions 94' and body 42 is inserted within housing 86 until lock tangs 98 spring out into side lock slots 74. This action will compress spring 68 which will bias projections 54, 56 into engagement with entry portions 94', with nose portions 57 entering central bore portion 96.

Terminal connector 10 is assembled by grasping it and orienting projection nose portions 26 with bore entry portions 94. Connector 10 is inserted within housing 86 until lock tangs 36 spring out and engage shoulders 102. This action will contact nose portions 26 with nose portions 57 prior to latching, since the combined lengths of the nose portions is greater than that of the bore central portion.

The function of the connector system described assures the alignment and biased engagement of the ends of the pairs of fibers 16 and 50, and of fibers 18 and 48. Because of the geometry and dimensional relationship of the terminal projections and the receptacle bores, only a single spring need be used.

Thus, this invention provides a low cost fiber optic connector system in which two cables are connected in-line through a wall through a wall-mounted connector which requires the use of only one spring.

While only a preferred embodiment has been shown and described, obvious modifications are contemplated within the scope of this invention and of the following claims. For example, the invention is applicable to the connection of fiber optic cables having one or multiple fibers.

I claim:

1. A connector system for operatively connecting the ends of two fiber optic cables together, wherein each cable includes at least one optical fiber, comprising:

an elongated receptacle containing a through bore;

first and second terminal connectors mounted on the respective ends of the cables and containing the respective ends of the fibers at the terminal ends thereof, the terminal connectors being insertable through opposite ends of the bore into abutment of the terminal ends at an interface location along a central portion of the bore;

first latch means on the receptacle and on the first terminal connector cooperable upon insertion of the first terminal connector into the bore through one end thereof for latching the first terminal connector within the bore with the end of its fiber located along said central portion, said first terminal connector being held without bias and against reverse movement out of that end of the bore;

a collar slidably mounted on the second terminal connector, spring means captured between the second terminal connector and the collar for biasing the second terminal connector and collar apart; and second cooperable latch means on the receptacle and on the collar for latching the collar to the receptacle upon insertion of the second terminal connector into the bore through the other end to a position such that the spring means biases the terminal end of the second terminal connector into engagement with the terminal end of the first terminal connector along said central portion of the bore.

2. The connector system of claim 1, wherein the spring means is a compression spring.

3. The connector system of claim 1, wherein the receptacle bore is tapered inwardly from each end, the central portion is substantially cylindrical, and each of the terminal connectors is matingly configured.

4. The connector system of claim 3, wherein each terminal end has a nose portion containing its fiber end, at least the nose portion of the second terminal connector being cylindrical, and the total length of connector cylindrical nose portions being sufficiently greater than the length of the bore central portion to assure abutment of the terminal ends by the spring means.

5. The connector system of claim 3, wherein each of the connectors has a nose portion which contains its fiber end and is configured to mate with the bore central portion, with the combined length of the nose portions being sufficiently greater than the length of the bore central portion to assure mutual abutment of the terminal ends by the spring means.

6. The connector system of claim 5, wherein the spring means is a compression spring.

7. The connector system of claim 1, further including a wall-mountable plate mounting the receptacle arranged for connecting the first terminal connector exteriorly of a wall mounting the plate and the second terminal connector interiorly of the wall.

8. The connector system of claim 7, wherein the receptacle bore is tapered inwardly from each end, the central portion is substantially cylindrical, and each of the terminal connectors is matingly configured.

9. The connector system of claim 8, wherein each terminal end has a nose portion containing its fiber end, at least the nose portion of the second terminal connector being cylindrical, and the total length of connector cylindrical nose portions being sufficiently greater than the length of the bore central portion to assure abutment of the terminal ends by the spring means.

10. The connector system of claim 8, wherein each of the connectors has a nose portion which contains its fiber end and is configured to mate with the bore central portion, with the combined length of the nose portions being sufficiently greater than the length of the bore central portion to assure mutual abutment of the terminal ends by the spring means.

11. The connector system of claim 10, wherein the spring means is a compression spring.

12. A connector system for operatively connecting the ends of two fiber optic cables together, wherein each cable includes two fibers, comprising:

an elongated receptacle containing two parallel through bores;

first and second terminal connectors mounted on the respective ends of each cable and comprising a pair of spaced terminal projections each containing the end of a fiber at its terminal end, the terminal projections of the first terminal connector being insertable together through the same ends of the bores and the terminal projections of the second terminal connector being insertable through the opposite ends of the bores into abutment of the terminal ends at an interface location along central portions of the bores;

first latch means on the receptacle and on the first terminal connector cooperable upon insertion of its terminal projections into the bores for latching the projections within the bores with the terminal ends located along said central portions, said projections being held without bias and against reverse movement out of the ends of the bores;

a collar slidably mounted on the second terminal connector, spring means captured between the second terminal connector and the collar for biasing the collar and the second terminal connector apart;

second cooperable latch means on the receptacle and on the collar for latching the collar to the receptacle upon insertion of the terminal projections of the second terminal connector into the bores to a position such that the spring means biases its terminal ends into engagement with the terminal ends of the first terminal connector along said central portion of the bore.

13. The connector system of clam 12, further including a wall-mountable plate mounting the receptacle for connecting the first terminal connector exteriorly of a wall mounting the plate and the second terminal connector interiorly of the wall.

14. The connector system of claim 12, wherein the receptacle bores are tapered inwardly from each end, the central portions are substantially cylindrical, and each of the terminal projections is matingly configured.

15. The connector system of claim 12, wherein each terminal projection end has a nose portion containing its fiber end, at least the nose portions of the terminal projections of the second terminal connector being cylindrical, and the total length of projection cylindrical nose portions being sufficiently greater than the length of the bore central portions to assure abutment of the projection ends by the spring means.

16. The connector system of claim 12, wherein each of the terminal projections has a nose portion which contains its fiber end and is configured to mate with the bore central portion, with the combined length of the opposing nose portions being sufficiently greater than the length of the bore central portion to assure mutual abutment of the terminal projection ends by the spring means.

17. The connector system of claim 16, wherein the spring means is a compression spring.

* * * * *